US006787050B2

(12) United States Patent
Parish

(10) Patent No.: US 6,787,050 B2
(45) Date of Patent: Sep. 7, 2004

(54) POWER DISTRIBUTION ARCHITECTURE FOR INKJET HEATER CHIP

(75) Inventor: George Keith Parish, Winchester, KY (US)

(73) Assignee: Lexmark International, Inc., Lexington, KY (US)

( * ) Notice: Subject to any disclaimer, the term of this patent is extended or adjusted under 35 U.S.C. 154(b) by 174 days.

(21) Appl. No.: 10/242,993

(22) Filed: Sep. 13, 2002

(65) Prior Publication Data

US 2003/0011658 A1 Jan. 16, 2003

Related U.S. Application Data

(62) Division of application No. 09/833,887, filed on Apr. 12, 2001, now Pat. No. 6,616,268.

(51) Int. Cl.[7] ........................ G01D 15/00; G11B 5/127

(52) U.S. Cl. ........................................................ 216/27

(58) Field of Search ............................ 216/27; 438/21; 29/890.1; 347/20, 22, 29, 40, 44, 45, 56, 54, 62, 64, 71, 74, 75

(56) References Cited

U.S. PATENT DOCUMENTS

| | | | | | |
|---|---|---|---|---|---|
| 4,458,256 | A | | 7/1984 | Shirato et al. | |
| 4,812,859 | A | | 3/1989 | Chan et al. | |
| 4,872,027 | A | | 10/1989 | Buskirk et al. | |
| 4,887,098 | A | * | 12/1989 | Hawkins et al. | 347/58 |
| 4,985,710 | A | | 1/1991 | Drake et al. | |
| 5,144,341 | A | * | 9/1992 | El Haten et al. | 347/58 |
| 5,159,353 | A | | 10/1992 | Fasen et al. | |
| 5,600,354 | A | | 2/1997 | Hackleman et al. | |
| 5,635,966 | A | | 6/1997 | Keefe et al. | |
| 5,644,342 | A | | 7/1997 | Argyres | |
| 5,844,586 | A | * | 12/1998 | Berry et al. | 347/59 |
| 5,980,025 | A | * | 11/1999 | Burke et al. | 347/62 |
| 6,019,457 | A | | 2/2000 | Silverbrook | |
| 6,019,907 | A | | 2/2000 | Kawamura | |

* cited by examiner

*Primary Examiner*—Gregory Mills
*Assistant Examiner*—Roberts Culbert
(74) *Attorney, Agent, or Firm*—Luedeka, Neely & Graham, P.C.

(57) ABSTRACT

A heater chip for use in an inkjet printer which includes a single conductive layer to provide electrical connectivity between power and ground inputs. Wherein the unique power distribution architecture is possible by the formation of a plurality of ink vias in the heater chip which provides for an increase in the chip surface area available for electrical connectivity.

3 Claims, 8 Drawing Sheets

POWER DISTRIBUTION ARCHITECTURE FOR INKJET HEATER CHIP

This application is a divisional of application Ser. No. 09/833,887 filed Apr. 12, 2001 now U.S. Pat. No. 6,616,268.

FIELD OF THE INVENTION

The present invention is generally directed to inkjet printers. More particularly, the invention is directed to an improved inkjet heater chip architecture wherein a single layer of metallization is used for the interconnecting circuitry.

BACKGROUND OF THE INVENTION

Due to the complexity of inkjet heater chips having active electronic circuitry, the power distribution architecture requires two or more layers of metallization (conducting layers) on the silicon substrate for providing electrical connectivity to the heating elements and driving circuitry for a printhead of an inkjet printer. Requiring multiple conductive layers adds to the cost and complexity of each heater chip, making for a more expensive heater chip. Furthermore, a dielectric layer is required between the conductive layers to prevent interaction of the conductive traces of different conductive layers. Having multiple conductive and dielectric layers requires a multiple step process adding to the cost and complexity required to manufacture a single chip.

A conventional ink jet heater chip is shown in FIG. 1. As shown in FIG. 1, a portion of a prior art heater chip 1, including an ink via 2, and the related chip electronics illustrates the associated requirement for multiple metallization (conductor) layers. As shown, the ink via 2 is an elongate channel and typically traverses the entire length of the chip 1. The large ink via and its placement provides ink to each of the heaters 4 on the chip 1. To provide power to the heaters 4, a number of metallization layers are utilized. The metallization layers include the connecting circuitry between the heaters 4, power bond pads 6, ground bond pads 8 and driving elements 9. The power and ground bond pads, 6 and 8, respectively are used to attach a tape automated bonded (TAB) circuit to the heater chip 1 to electrically connect the circuits to a printer controller.

As shown in FIG. 1, the ink via 2 is located between the heaters 4 and associated enabling electronics for distributing ink to the heaters 4. Since the ink via 2 is located between the heaters 4, power bond pads 6 and ground bond pads 8 are necessarily located on the same side of the heater chip 1. Due to the location of the ink via 2 and the co-location of the power and ground bond pads 6 and 8, two or more metallization layers with intermediate dielectric layers are required to connect the heater 4 between the ground bond pad 8 and power bond pad 6. Multiple metallization layers interspersed with dielectric layers are required so that the electrical connectors connecting the ground and power bond pads 8 and 6, respectively with the heaters 4 do not contact one another. Hence, due to this chip architecture, specifically the location of the ink via 2, the electrical connections are necessarily in an overlapping configuration.

SUMMARY OF THE INVENTION

A need exists for a less costly and complex heater chip design. Accordingly, the invention provides a low cost single level metallization heater chip architecture. According to a preferred embodiment of the invention, a printhead heater chip is provided for use in a printhead of an inkjet printer having a printer controller. The heater chip includes a substrate having a substrate surface and a device surface opposite the substrate surface. The device surface includes a power side and a ground side, wherein the power side and the ground side are in opposing relation on the device surface of the chip. A plurality of transistor devices are also located on the device surface of the chip and separate the power and ground sides of the heater chip. Each transistor device includes a gate region, source region and drain region, and is selectively activated according to a logical input from the printer controller. A plurality of resistive heating devices are located on the device surface of the substrate and are electrically connected to the plurality of transistor devices. Each resistive heating device includes a first end and a second end and each heating device is selectively activated according to the activation of a respective transistor device. A plurality of ink vias etched through from the substrate surface to the device surface are located in a spaced apart array for providing ink from an ink reservoir adjacent the substrate surface of the chip to one or more of the resistive heating elements, wherein the ink vias are located between the transistor devices and the power side of the heater chip. The chip includes at least one ground input defined by a single layer of conductive material, wherein the ground input is located proximate the ground side of the device surface of the chip and selectively electrically connected to each source of each transistor device and provides a logical input to a selected transistor device. A plurality of address lines are partially defined by the single layer of conductive material during the chip manufacturing process and are located proximate the ground side the chip, each address line selectively connects a gate of a transistor device and provides a logical input to a selected transistor device. At least one power input is defined by the single layer of conductive material during the chip manufacturing process and is located proximate the power side of the chip, wherein the power input is selectively electrically connected to each drain of each transistor device for providing a logical input to a selected transistor device. The chip has an electrical trace configuration defined by the single layer of conductive material during the chip manufacturing process, electrically connecting the resistive heating elements to the power and ground inputs.

In another embodiment of the invention, a printhead for use in an inkjet printer has a printer controller for controlling the operation of the printer according to printing logic. The printhead includes a heater chip formed from a silicon substrate including a device surface and a substrate surface opposite the device surface which includes a power side and a ground side, wherein the power side and the ground side are in opposing relation on the device surface of the chip. The heater chip includes a plurality of transistor devices located on the device surface of the chip between the power side and the ground side, having connecting regions thereon, wherein each transistor device is selectively enabled according to a logical input from the printer controller. A plurality of resistive heating devices are located on the device surface of the chip, each resistive heating device having a first end and a second end and each resistive heating device is electrically connected to a corresponding transistor device. Each heating device is selectively activated according to the enabling of a respective transistor device based on a logical input from the printer controller. The chip includes a plurality of ink vias etched through the chip from the device surface to the substrate surface which provide ink from an ink reservoir adjacent the substrate surface to one or more of the resistive heating elements, wherein the ink vias are located between the transistor devices and the power side of the heater chip. At least one ground input is defined by a single layer of conductive material during a chip manufacturing process, wherein the ground input is located proximate the ground side of the chip and is electrically connected to each transistor device. The ground input provides a logical input to a selected transistor device. A plurality of address lines partially defined by the single layer of conductive material during the chip manufacturing process are located proximate the ground side of the chip, each address line is selectively connected to a transistor device for providing a logical input to a selected transistor device. The chip also includes at least one power input defined by the single layer of conductive material, located proximate the power side of the chip, wherein the power input is selectively electrically connected to each transistor device for providing a logical input to a selected transistor device. The chip has an electrical trace configuration defined by the single layer of conductive material during the chip manufacturing process, the electrical traces electrically connect the resistive heating elements to the power and ground inputs. The printhead further includes a plurality of nozzles in a nozzle plate attached to the device surface of the heater chip for ejecting ink when a resistive heating element is activated.

In another embodiment of the invention, a heater chip for use in an inkjet printer includes a substrate having a plurality of driving transistors formed on a device surface of the substrate, each driving transistor having associated electrical contact regions thereon. The device surface of the heater chip also includes a polysilicon layer selectively masked and etched to form at least one input for each driving transistor and a plurality of polysilicon electrical connections, a dielectric layer selectively masked and etched to expose portions of the polysilicon layer, a resistive layer composed of at least one metallic element therein, a single conductive layer composed of at least one metallic element therein, wherein the resistive and conductive layers are selectively masked and etched to define a plurality of resistive heating devices at locations where the conductive layer is etched only to the resistive layer, and a plurality of electrical connections defined by a dual layer structure of resistive and conductive material, wherein the dual layer structure electrically connects the resistive heating elements to a ground and a power structure defined by the etched dual layer metallic structure, and a protective layer of material is selectively masked and etched to cover selected portions of the dual layer metallic structure and the resistive heating devices, for protecting the dual layer structure and resistive heating elements from ink contamination. The heater chip includes a plurality of ink vias etched through the chip corresponding to a plurality of resistive heating elements.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows.

DETAILED DESCRIPTION OF THE INVENTION

Figure 2:
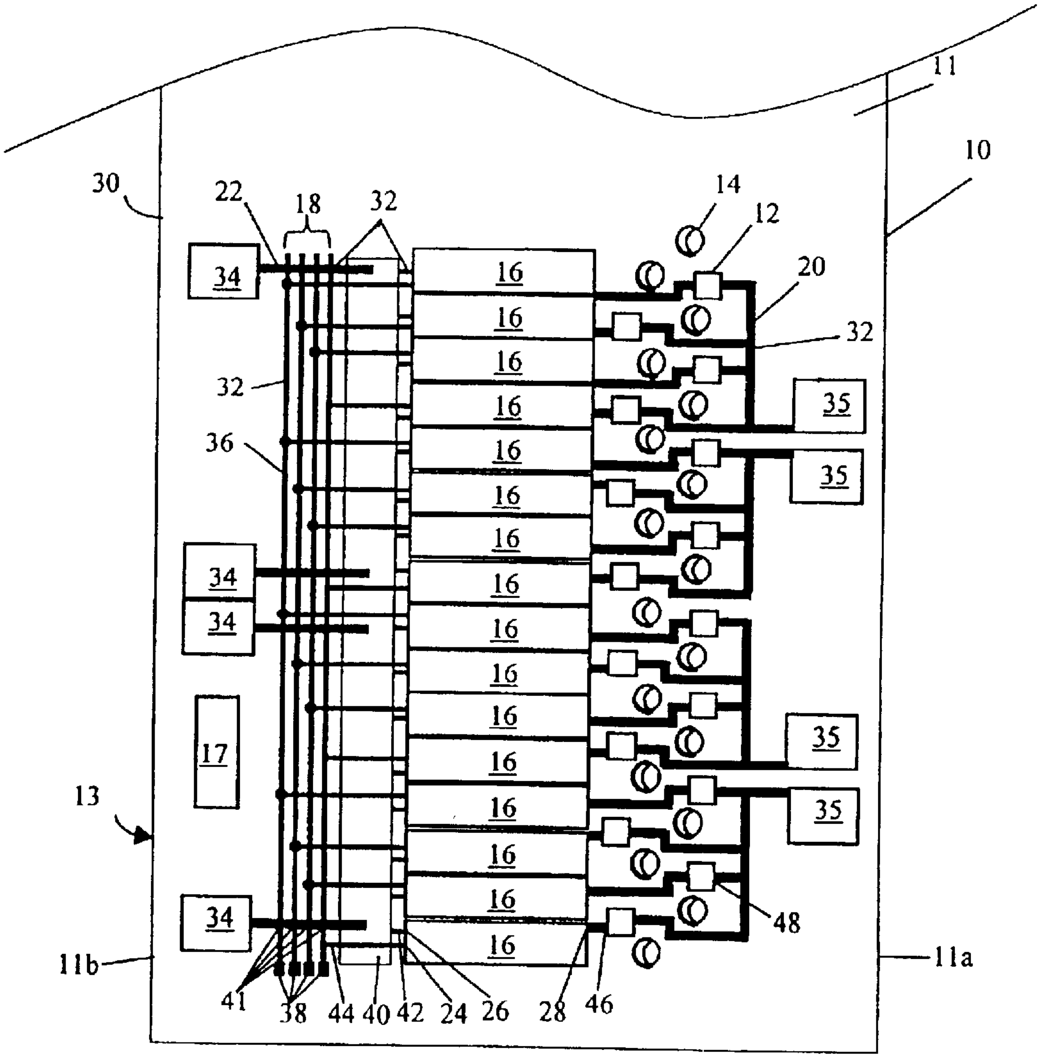
FIG. 2 is a partial schematic diagram of a device surface of a printhead heater chip, in accordance with the invention.

With initial reference to FIG. 2, a printhead for an ink jet printer includes at least one printhead heater chip 10. The heater chip 10 includes a device surface 11 having constituent electrical components in accordance with the invention attached hereto. According to the manufacturing process described herein for the chip 10, it becomes possible to locate the power input features of the chip on one area of the chip hereinafter referred to as "the power side" 11*a*, while locating the ground features of the chip 10 on an opposing area of the chip 10, hereinafter referred to as "the ground side" 11*b*. The device surface 11 of the heater chip 10 includes a plurality of resistive heater elements 12, hereinafter heaters 12, and a plurality of ink feed vias 14 therein, corresponding to one or more of the heaters 12. According to the invention, the heater chip 10 is relatively small in size and typically has overall dimensions preferably ranging from about 2 to about 4 millimeters wide by about 10 to about 20 millimeters long.

For comparison purposes reference is made again to FIG. 1, depicting a conventional heater chip 1. The conventional chip 1 includes a slot-type ink via 2 which is typically grit blasted in the chip 1. The ink via slot 2 is effective to feed ink to a plurality of heater resistors 4 and typically has dimensions of about 9.7 millimeters long and 0.39 millimeters wide. Accordingly, the conventional chip 1 must have a width sufficient to contain the relatively wide ink via 2 while considering manufacturing tolerances, and sufficient surface area for heater resistors 4, driving elements and electrical connectors, connecting the heater resistors 4 and driving elements. For efficiency of construction and operation ground and power bond pads 8 and 6, and the related electrical circuitry connecting the pads 8 and 6 to the heater resistors and driving elements 9, must be co-located on the chip 1. As a result of the co-location of power and ground, during the manufacturing process of the chip 1, multiple overlapping conductive layers, not including resistive layers, are required to electrically connect the heater resistors 4 between power and ground. Additionally, at least one dielectric layer is required between the multiple overlapping conductive layers to prevent the occurrence of shorts between the overlapping layers, adding to the manufacturing cost of the chip.

According to one embodiment of the invention, as best shown in FIG. 2, the chip 10 includes a plurality of ink via holes 14 etched through the chip 10 from the device surface 11 to a substrate surface 13, opposite the device surface 11. The plurality of ink via holes 14 correspond and provide ink to one or more of the heaters 12. By including a plurality of ink via holes 14, hereinafter ink vias 14, throughout the heater chip structure, the invention provides for substantially reducing the amount of chip surface area required for the ink vias 14, heaters 12, driving elements 16 and connecting circuitry, as described in more detail below. Accordingly, reducing the size of the chip 10 enables a substantial increase in the number of heater chips 10 that may be obtained from a single silicon wafer. Moreover, due to the unique chip architecture, it becomes possible to connect the heaters 12 between power and ground inputs utilizing a single conductive layer of material during the chip manufacturing process. Since a single conductive layer is used to electrically connect the heaters 12, less conductive material is required and no interleaving dielectric layers are necessary. Hence, the invention provides substantial incremental cost savings over chips made by conventional techniques containing slot type ink vias 2 and the associated electrical architecture.

The heater chip 10 includes a number of driving elements 16, preferably MOSFETs, each having a polysilicon gate 24, source 26, and drain 28. The driving elements 16 are operable to selectively enable the heaters 12 according to a logic structure provided by a printer controller of the printer. The printer controller controls the action of the heater chip 10 through a flexible circuit, preferably a tape automated bonding (TAB) circuit. A substrate heater 17 is located on the chip 10 for electrically heating the chip 10, according to commands issued from the printer controller. The heater chip 10 includes a plurality of electrical traces, including but not limited to address traces 18, power traces 20 and ground traces 22. The electrical traces are used according to the logic structure of the printer controller, selectively providing electrical power to the heaters 12. The electrical trace structure and printer controller logic provides selective heater activation according to a desired print resolution, speed and other user defined criteria.

The improved heater chip architecture eliminates the requirement for more than one conductive layer electrically connecting the heaters 12 between power and ground. The improved chip architecture becomes possible by providing a chip 10 containing a plurality of ink vias 14 in the chip 10. Preferably, the ink vias 14 are formed to define a spaced apart array of ink vias 14. The spaced apart array of ink vias 14 provides chip surface area for the location of the electrical trace structure, as described further below. The ink vias 14 are preferably formed after the electrical circuitry is completed, utilizing a deep reactive ion etching (DRIE) process. However, other processes are available for forming the ink vias 14 and the invention is not intended to be limited to a DRIE process for forming the ink vias 14.

Figure 3:
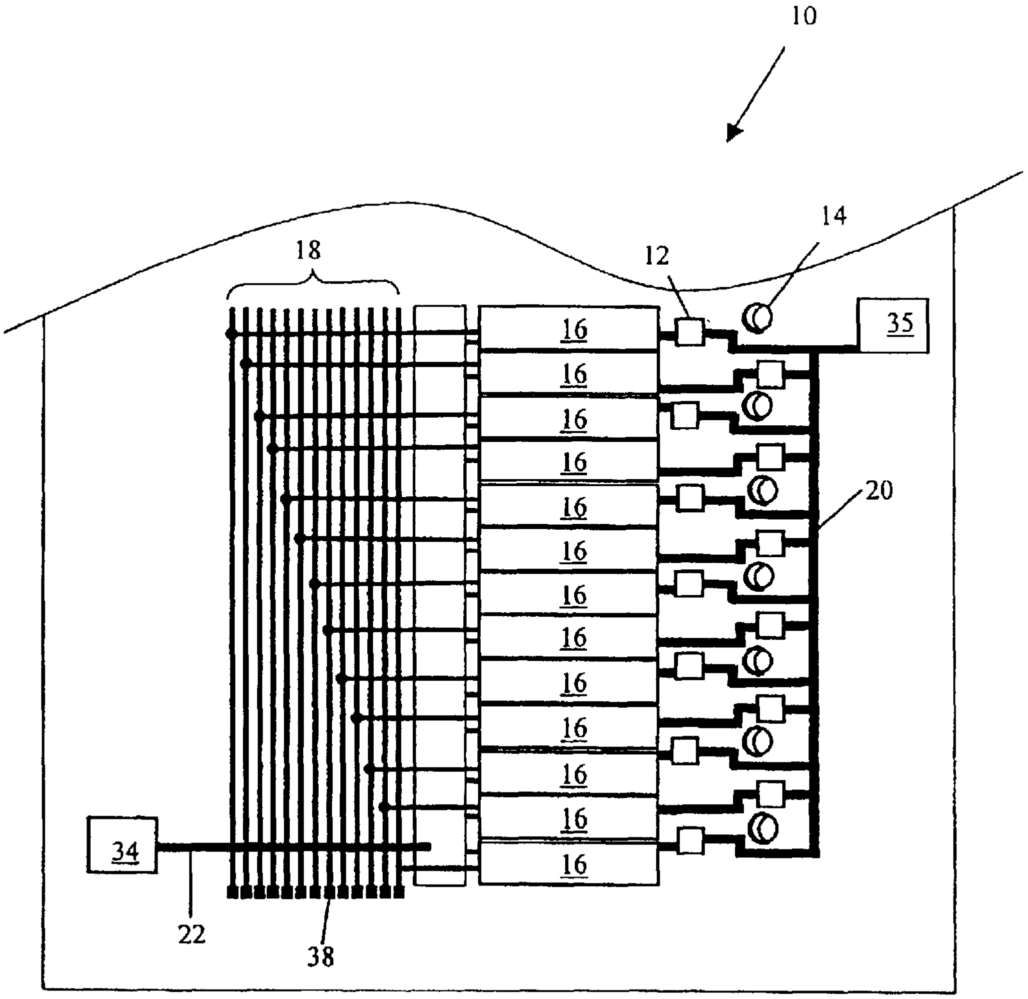
FIG. 3 is a partial schematic diagram of a device surface of a printhead heater chip, in accordance with another embodiment of the invention.

The multiple ink vias 14 provide ink from an ink reservoir attached adjacent the substrate surface 13 of the chip 10 to one or more heater elements 12 on the chip 10. In one embodiment, as shown in FIG. 2, an ink via 14 corresponds to a heater 12, i.e. a one to one correspondence. Each ink via 14 provides ink from the ink reservoir to the heater 12. Preferably, each ink via 14 is spaced from about 50 to about 75 microns from each heater 12. According to an alternative embodiment of the invention, as shown in FIG. 3, one ink via 14 is associated with two heaters 12, providing ink from the ink reservoir to both heaters 12. In this embodiment, each ink via 14 is spaced from about 50 to about 100 microns from each set of heaters 12. As the number of ink vias 14 decreases, a corresponding amount of chip surface area is available for the location of the electrical trace structure. It will be understood that the invention is not intended to be limited to any specific via to heater configuration, and it will be appreciated that there are numerous via/heater 14/12 configurations possible for the chip 10.

Figure 2A:
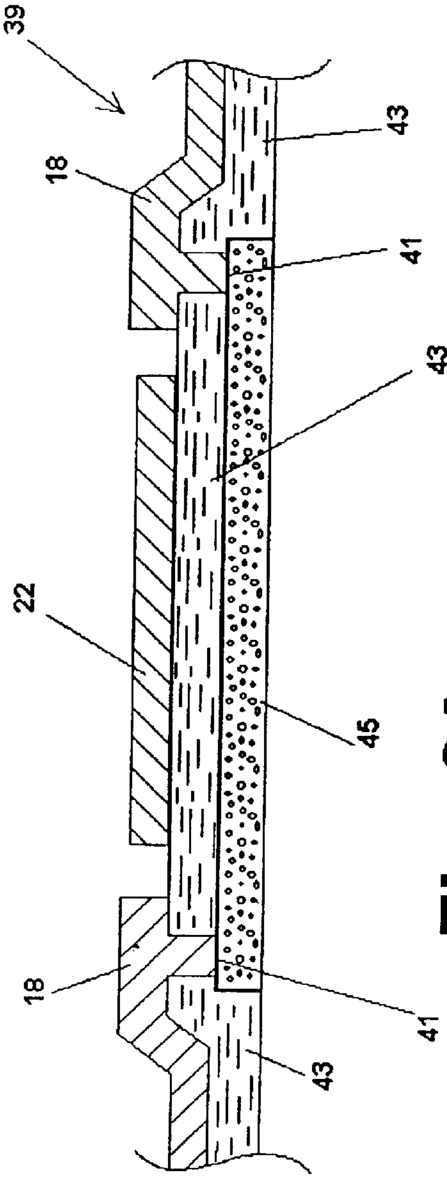
FIG. 2A is a partial cross-sectional view of a polysilicon electrical junction for a heater chip according to the invention.
Figure 2B:
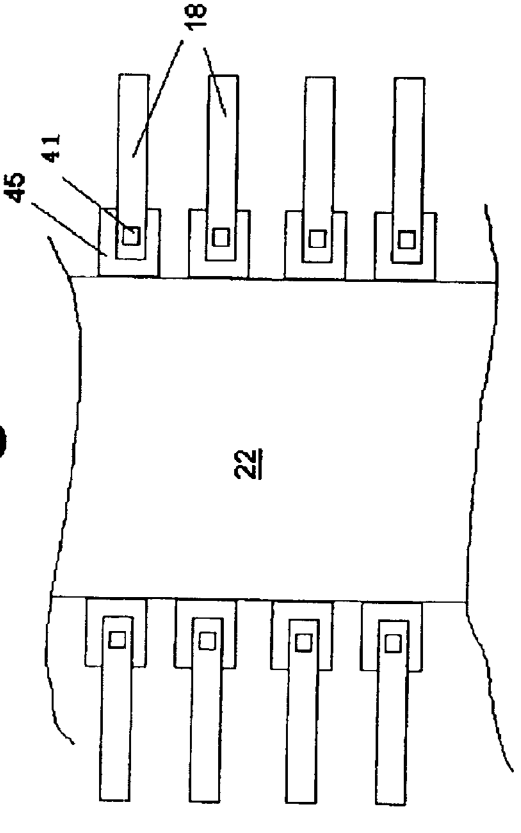
FIG. 2B is a plan view of a portion of a polysilicon electrical junction and bus crossover for a heater chip according to the invention.

The chip 10 architecture includes metallic trace connections defined by the single metal conductive layer. The metallic trace connections 32 include, but are not limited to, a plurality of ground bond pads 34 and power bond pads 35, ground traces 22, portions 36 of the address lines 18 and connection pads 38 therefor, power traces 20, and a ground bus 40 including ground connectors 42. The address lines 18 and ground traces 22 are provided by a composite address line structure 39 illustrated in more detail ink FIGS. 2A and 2B. The ground and power bond pads 34 and 35, and the connection pads 38 are for connecting the chip 10 to corresponding pads on a TAB circuit. When the chip 10 is connected to the TAB circuit, the printer controller is able to communicate with the chip 10 according to the logic structure defined by the printer controller.

In accordance with the invention, the ground bond pads 34 are located proximate the ground side 11*b* of the chip 10. Each ground bond pad 34 is electrically connected to the ground bus 40 by way of the ground traces 22. More specifically, where the ground traces 22 cross the address lines 18, as described with reference to FIGS. 2A and 2B, there is a dielectric layer 43 formed over the polysilicon electrical junctions 41 between the address lines 18 and a polysilicon junction layer 45 so that a short does not develop between the ground trace 22 and the address lines 18. The ground bus 40 is connected to the transistor array with the ground connectors 42, electrically connecting the ground bond pads 34 and ground bus 40 to the source regions 26 of the transistor array. For a chip 10 having 208 heaters, as shown partially in FIG. 2, there are fifty-two ground and power bond pads 34 and 35, each pad being electrically connected to four heaters 12. In a preferred embodiment of the invention (FIG. 6), there are 13 address lines, 16 ground bond pads, and 16 power bond pads 35, electrically connecting and selectively enabling one or more of the 208 heaters 12, according to the logic structure transmitted by the printer controller.

The single etched conductive layer further defines the metallic portions 36 of the composite polysilicon/metallic address lines 18 (address bus). It should be noted that the only non-metallic portion of the electrical trace circuitry are the polysilicon address line connections 44, and the polysilicon electrical junctions 41 which define a portion of the address line structure 18. As described below, the electrical junctions 41 are disposed beneath the dielectric, resistive and conductive layers, specifically beneath the each ground trace 22 and underlying dielectric layer. The polysilicon electrical junctions 41 coupled with the etched conductive layer (conductive portions 36), define the composite address lines 18. Each address line 18 is selectively electrically connected to the gate regions 24 of the transistor array. The polysilicon address line connections 44 electrically connect the metallic portions 36 of the address lines 18 to the transistor array.

Figure 6:
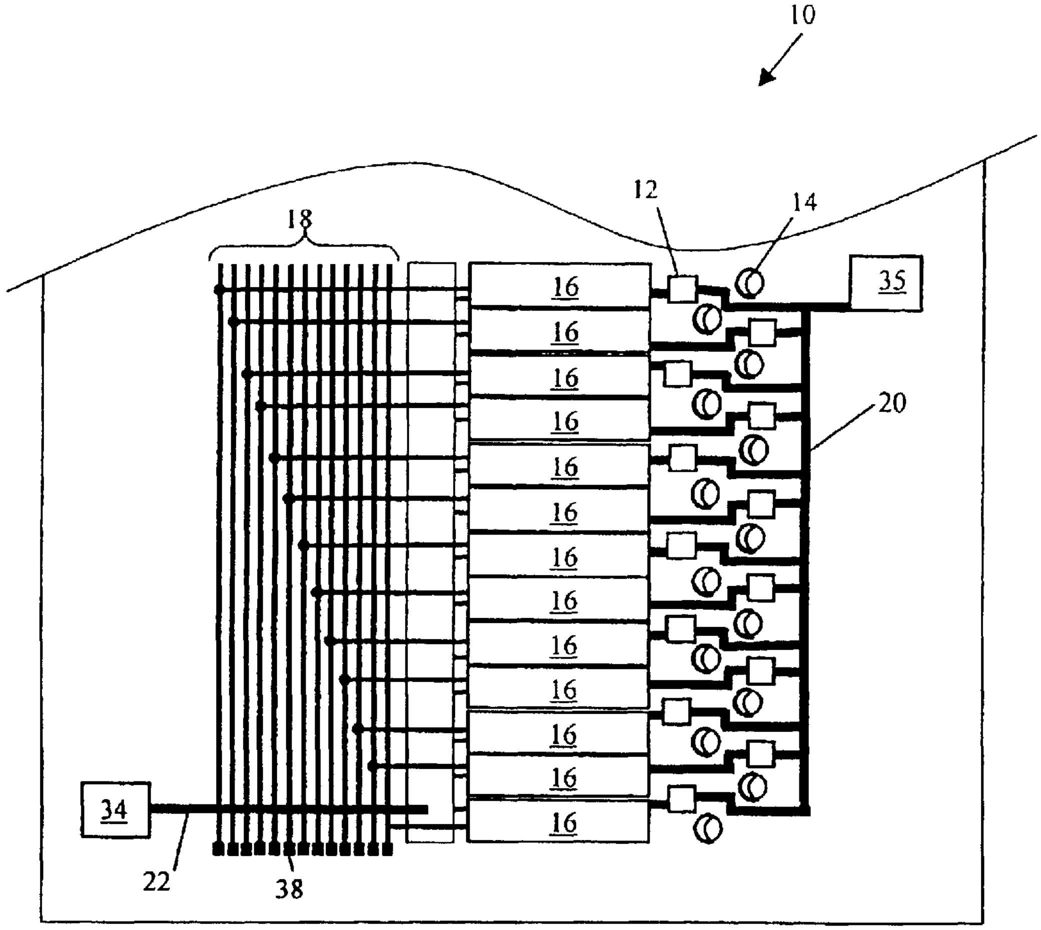
FIG. 6 is a partial schematic diagram of a device surface of a printhead heater chip, in accordance with yet another embodiment of the invention.

The power traces 20 electrically connect each source region 26 of each transistor 16 to the driver side 46 of a respective heater 12. Similarly, the power traces 20 electrically connect the power side 48 of a respective heater 12 to a power bond pad 35. As shown in FIG. 2, four heaters 12 are electrically connected to a single power bond pad 35 via the power traces 20. For a preferred embodiment of the invention, as best shown in FIGS. 3 and 6, sixteen sets of thirteen heaters 12 are each electrically connected to a single power bond pad 35 via the power trace structure 20.

Figure 4:
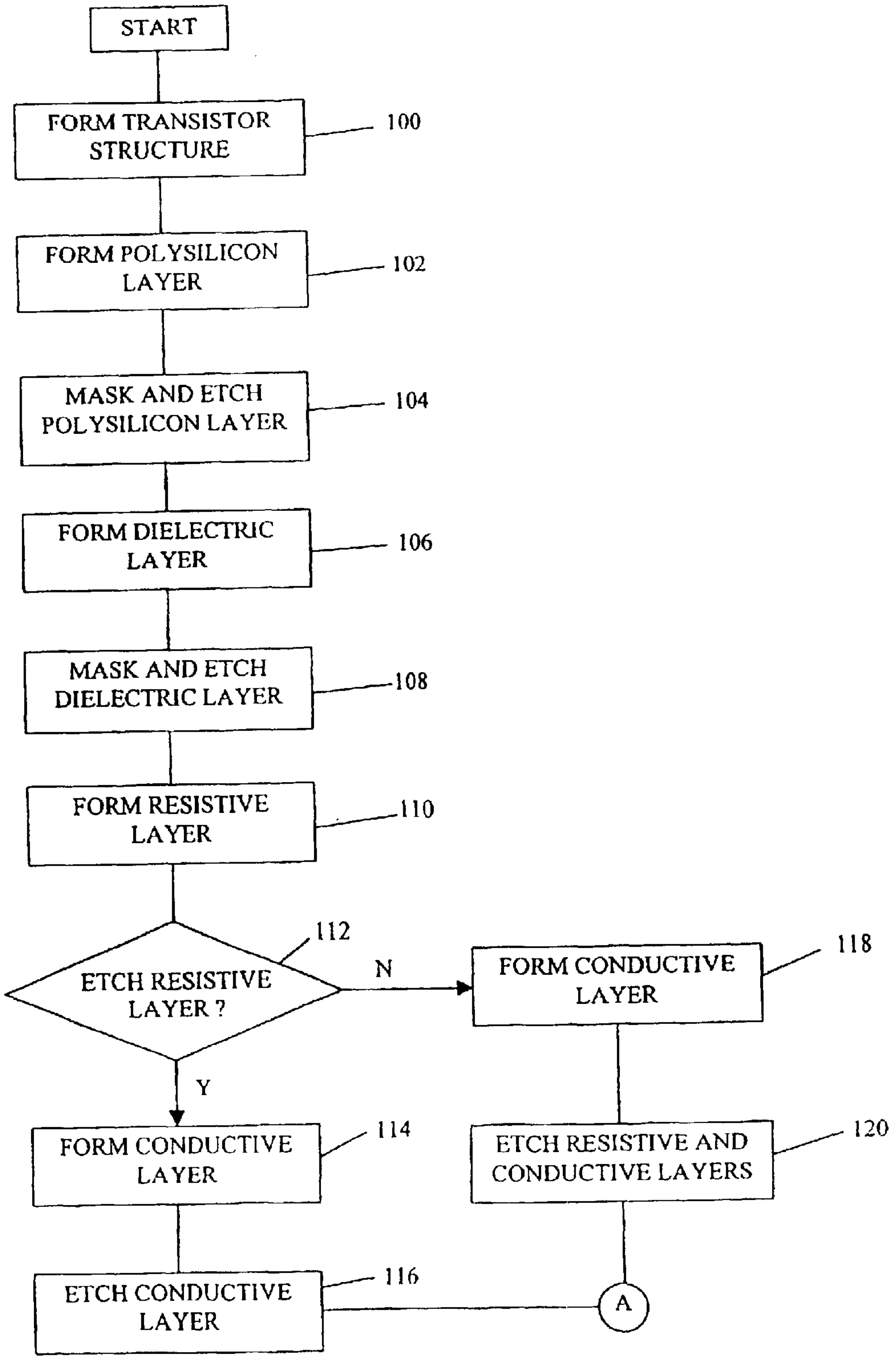
FIGS. 4 and 5 depict a flow diagram of a manufacturing process for manufacturing a heater chip, in accordance with the invention.
Figure 5:
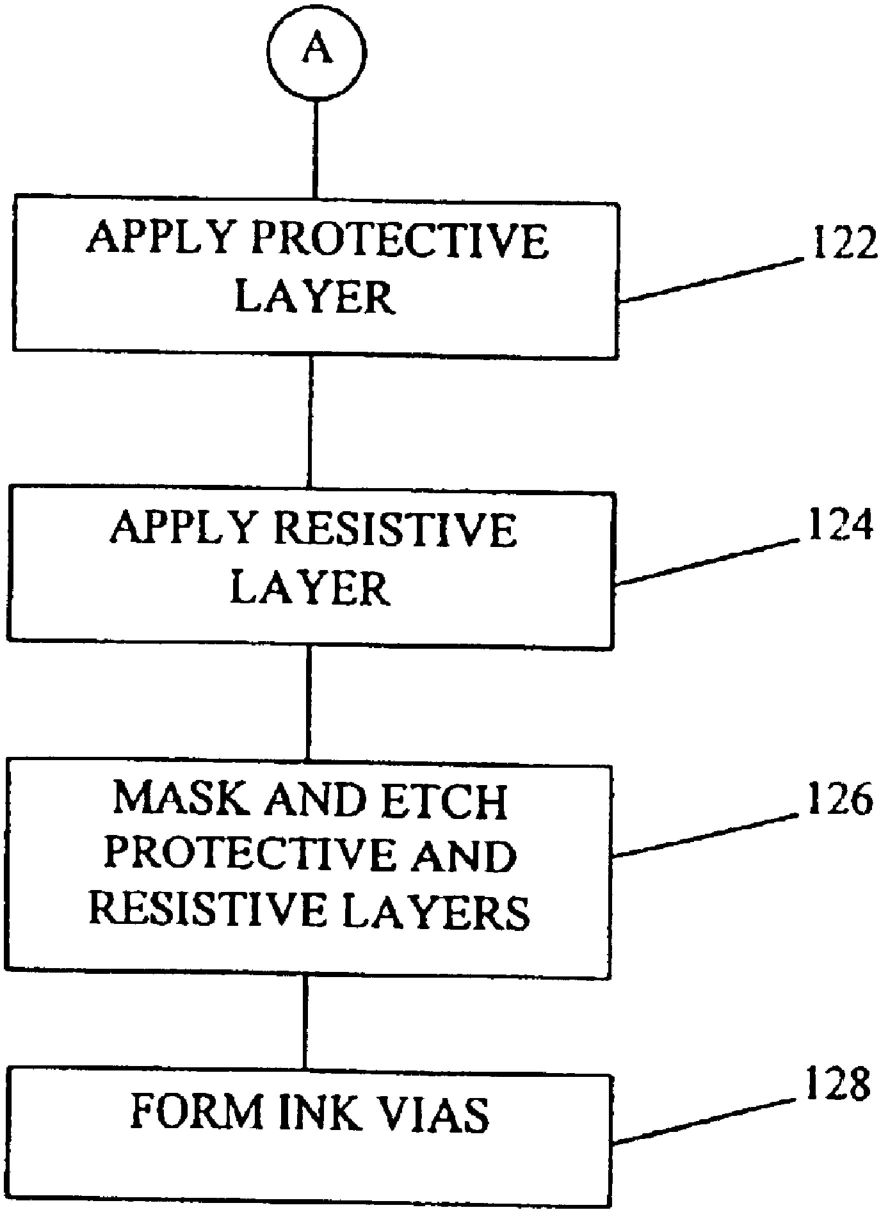

With reference now to FIGS. 4 and 5, the manufacturing process of the heater chip 10 defines at least one transistor 16 on a silicon substrate using well-known transistor formation techniques (step 100). Accordingly, various well known layer formation techniques are used in the chip manufacturing process, including but not limited to, thermal oxidation, chemical vapor deposition (CVD), plasma-enhanced chemical vapor deposition (PECVD), low-pressure chemical vapor deposition (LPCVD), and masking/imaging processes used for layer definition.

Preferably, the manufacturing process defines a plurality of MOSFETs, each having a polysilicon gate 24, source 26, and drain 28. The polysilicon portion of the gate 24 is formed by applying a layer of polycrystalline silicon (polysilicon) to the substrate (step 102). Application of the polysilicon layer is generally performed by the LPCVD deposition of silicon resulting from the decomposition of a selected silicon-based composition, preferably silane ($SiH_4$). The polysilicon layer preferably has a thickness ranging from about 4000 angstroms to about 6000 Angstroms.

At step 104, the polysilicon layer is masked and etched to leave the polysilicon gate 24 of each transistor 16. The etched polysilicon also preferably defines the plurality of address line connectors 44 (FIGS. 2, 3, and 6), which electrically connect selected address lines 18 (or an address bus), formed in a subsequent step, to a selected gate 24 of a transistor 16 in the transistor array. The number of address line connectors 44 is dependent upon the specific design criterion used during the manufacturing process of chip 10.

A layer of dielectric material, preferably silicon glass, is applied by a chemical vapor deposition (CVD) process over the etched polysilicon layer and transistors 16 (step 106). At step 108, the dielectric layer is masked and etched, exposing each polysilicon gate 24, source 26, and drain 28 region of each transistor 16, thereby providing the electrical contacts for connecting various portions of the electrical trace structure. As shown in FIG. 2, portions of the dielectric layer are etched revealing the polysilicon electrical junctions 41 of the composite address line (address bus) structure 39. Preferably, the dielectric layer has a thickness ranging from about 5000 angstroms to about 7000 Angstroms.

Next, at step 110, a resistive layer is applied over the dielectric layer. Preferably, the resistive layer is a sputtered tantalum/aluminum composite having a thickness ranging from about 900 Angstroms to about 1100 Angstroms. At this point in the chip manufacturing process, the designer has the option of etching the resistive layer (step 112). If the designer chooses to etch the resistive layer at this point, then the resistive layer is masked and etched. At step 114, a layer of conductive material is applied over the etched resistive material. Preferably, the conductive layer is a sputtered aluminum/copper composite having a thickness ranging from about 5000 to about 6000 Angstroms. At step 116, the layer of conductive material is masked and etched to form the electrical connections connecting the heaters 12 between the power side 11*a* and ground side 11*b* of the chip 10, as described above. If it is not desirable to etch the resistive material at step 112, then, at step 118, a layer of conductive material is applied over the resistive layer. At step 120, the resistive and conductive layers are masked and etched to electrically connect the heaters 12 between the ground side 11*b* and power side 11*a* of the chip 10.

Figure 7:
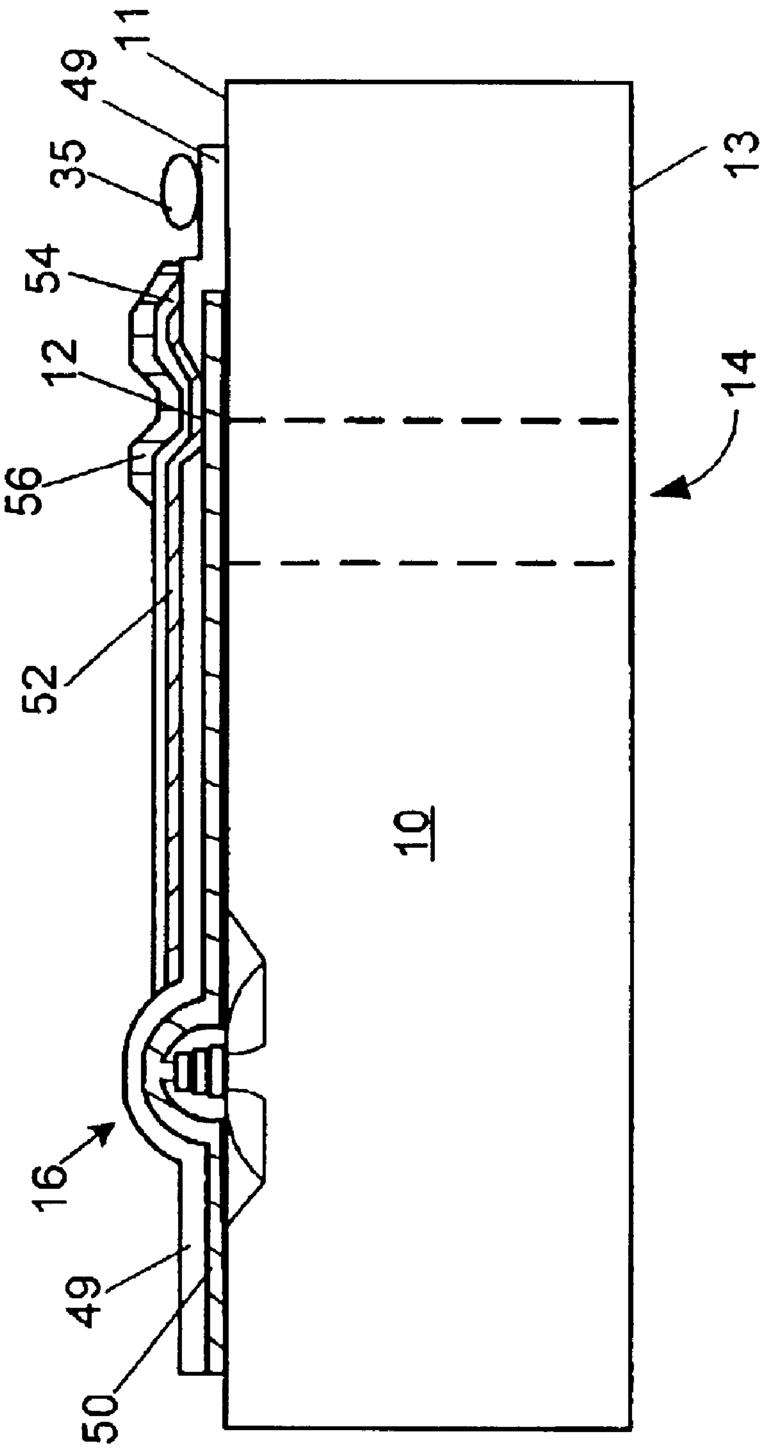
FIG. 7 is a cross-sectional view, not to scale of a portion of a heater chip according to the invention.

With reference also to FIG. 7, and according to a specific design criteria, during either of steps 116 or 120, portions of the conductive layer 49 are masked and etched, exposing areas of the resistive layer 50 (FIG. 7), thereby forming the heaters 12. As described above, the etching of the resistive and conductive layers 50 and 49 defines a multiplicity of metallic electrical trace connections 32, electrically connecting each heater 12 to the ground side 11*b* and power side 11*a* of the chip 10. Since the conductive layer 49 has a lower resistivity value than the resistive layer 50, the metallic trace connections 32 forming the electrical paths between power and ground traces 20 and 22 are defined by the single conductive layer 49 of material, with the exception of the heaters 12 which are defined by the exposed resistive layer 50.

After co-sputtering, masking and etching a single layer of conductive material 49 to form the structure described above, at step 122, a layer of protective material is applied over the layers defined heretofore. Preferably, the protective layer includes a first layer 52 comprising a silicon nitride composition. The silicon nitride layer 52 is preferably formed by a PECVD process for silicon nitride. Preferably, a layer of silicon carbide 54, is deposited over the silicon nitride layer 52. The silicon carbide layer 54 is also preferably formed using PECVD techniques The protective layer provides protection to the conductor material 49 and heaters 12 from ink contamination.

Finally, at step 124, a layer of resistive material, preferably a sputtered tantalum composition 56, is applied over the protective layer. The protective layer and resistive layers 50 are masked and etched so that the bond pads 34 and 35 are exposed for connecting to complimentary bond pads of a TAB circuit (step 126). Once the layers are formed and etched according to design criteria, at step 128, the plurality of ink vias 14 are formed, as described above. As described above and according to the invention, a single layer of conductive material 49 is utilized to connect the heaters 12 to the driving elements 16 and between ground and source connections. No external contact layer(s) of conductive material are required to electrically connect the heaters 12 in order to selectively apply driving energy thereto.

Figure 1:
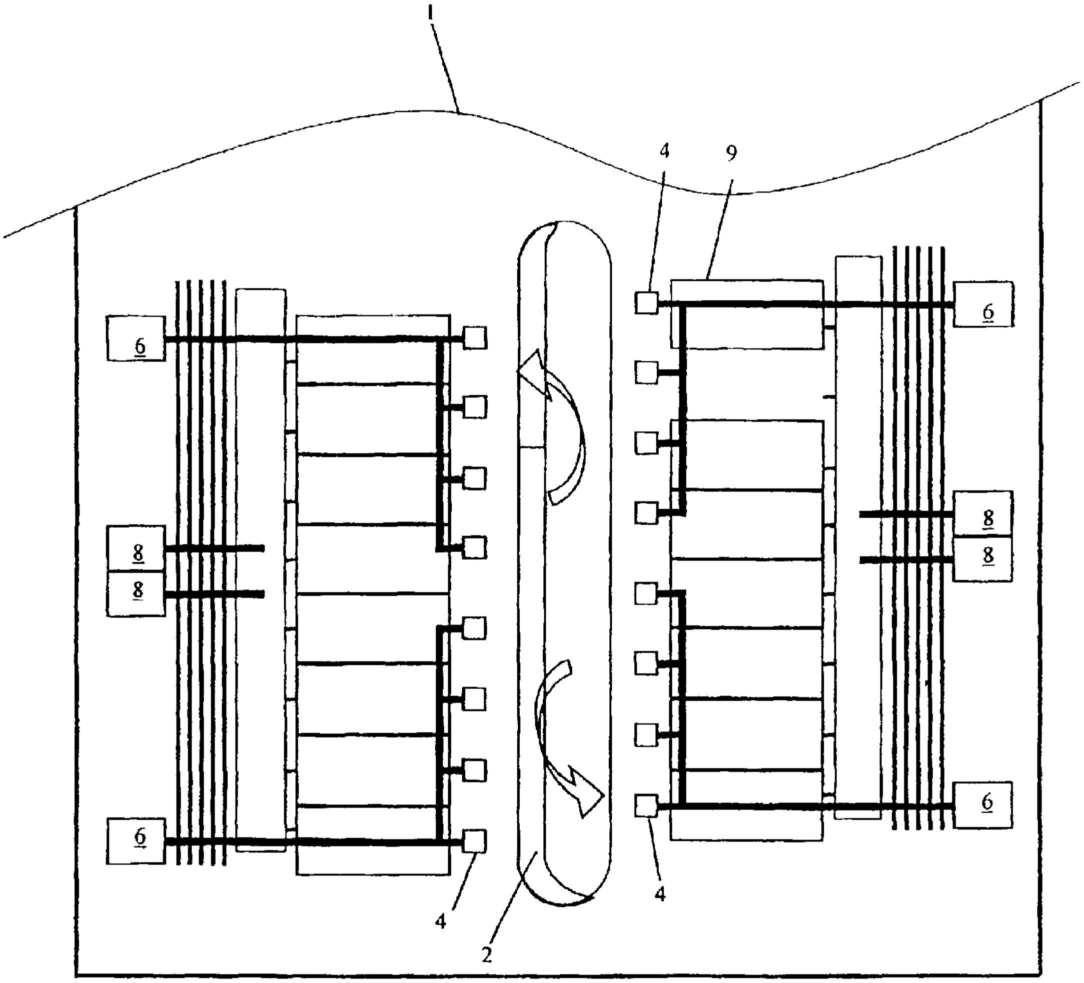
Fig. 1 (prior art)
FIG. 1 is a schematic diagram of a portion of a prior art printhead heater chip.

According to the invention, the multiple ink vias 14 located throughout the chip 10, allow the utilization of a single conductive layer in forming the power and ground connections. More specifically, the invention provides for locating the power bond pads 35 on an opposing side of the chip 10, relative to the location of the ground bond pads 34, allowing a single conductive layer of material to be utilized electrically connecting the heaters 12 during the chip manufacturing process. With a slot-type ink via 2 as shown in FIG. 1, there is insufficient space on the chip 1 to locate the pads 6 and 8 on opposing sides of the slot-type ink via 2, and therefore it is necessary to locate the ground and power bond pads 8 and 6 on the same side of the chip 1. Due to the limited space on the chip 1 for electrically connecting each heater 4 to power and ground, at least two layers of conductive material become necessary to form the electrical connections between the power, ground, and the heaters 4 and transistors 9 with an insulating or dielectric layer disposed between the conductive layers. As set forth above, the invention eliminates the need for such an insulating layer.

It will be recognized that the invention is not limited to the examples disclosed, and the manufacturing process is operable to provide numerous modifications of the connecting structure. Accordingly, it is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

I claim:

1. A process for manufacturing a heater chip utilized in a printhead of an ink jet printer, by configuring a silicon substrate having a substrate surface and a device surface opposite the substrate surface including a power portion and a ground portion in opposing relation thereon, including the steps of:

forming a plurality of driving transistors on the device surface of the substrate, each transistor having associated electrical contact regions thereabout, depositing a polysilicon layer on the device surface of the silicon substrate, selectively masking and etching the polysilicon layer to form at least one input for each driving transistor and a plurality of electrical connections on the device surface of the substrate, forming a dielectric layer atop the polysilicon layer, selectively masking and etching the dielectric layer, exposing selected portions of the polysilicon layer, forming a resistive layer comprising at least one metallic element therein, forming a single conductive layer comprising at least one metallic element therein, selectively masking and etching the resistive and conductive layers, defining a plurality of resistive heating devices at locations where the conductive layer is etched only to the resistive layer, and a plurality of electrical connections defined by a dual layer structure of resistive and conductive material, wherein the dual layer structure electrically connects the resistive heating elements to a ground and a power structure defined by the etched dual layer structure, applying a protective layer of material to cover selected portions of the dual layer metallic structure and the resistive beating devices with the protective layer of material for protecting the dual layer structure and resistive heating elements from ink contamination, and forming a spaced array of ink vias through the heater chip, wherein the number of ink vias correspond to a number of resistive heating elements.

2. The process of claim 1 wherein the step of forming a spaced array of ink vias comprises deep reactive ion etching the ink vias.

3. The process of claim 2 wherein the ink vias have a diameter or length and width ranging from about 5 to about 200 microns.

* * * * *

UNITED STATES PATENT AND TRADEMARK OFFICE

CERTIFICATE OF CORRECTION

PATENT NO. : 6,787,050 B2

DATED : September 7, 2004

INVENTOR(S) : George Keith Parish

It is certified that error appears in the above-identified patent and that said Letters Patent is hereby corrected as shown below:

Column 10,
Line 12, replace “beating” with -- heating --.

Signed and Sealed this

Nineteenth Day of April, 2005

JON W. DUDAS
*Director of the United States Patent and Trademark Office*